RADIO RELAYING

Filed April 12, 1945 2 Sheets-Sheet 1

INVENTORS
DONALD S. BOND
& LELAND E. THOMPSON
BY H. S. Grover
ATTORNEY

May 23, 1950 D. S. BOND ET AL 2,508,853

RADIO RELAYING

Filed April 12, 1945 2 Sheets-Sheet 2

INVENTORS.
DONALD S. BOND
& LELAND E. THOMPSON
BY
H. S. Grover
ATTORNEY

Patented May 23, 1950

2,508,853

UNITED STATES PATENT OFFICE 2,508,853

RADIO RELAYING

Donald S. Bond, Camden, and Leland E. Thompson, Merchantville, N. J., assignors to Radio Corporation of America, a corporation of Delaware Application April 12, 1945, Serial No. 588,012

22 Claims. (Cl. 250—15)

It is sometimes desirable to boost the field strength of a broadcast station in areas of low field strength due, for example, to the shadow effect of buildings, hills, etc., or to otherwise increase the primary service area of the broadcast station by means of "satellite" transmitters broadcasting the same program on the same frequency as the main transmitter.

The object of the present invention is to provide improved systems, apparatus and methods for accomplishing the foregoing.

Heretofore, in order to broadcast the same program simultaneously over two widely separated radio transmitters, the audio program has been sent to the distant radio transmitter by wire line. In accordance with the present invention, noise and distortion introduced by the wire lines are avoided in large measure, thus enabling the distant radio station to broadcast with as high quality as the radio station more closely situated to the program source or studio.

Other objects, advantages and features of the present invention will be evident as the more detailed description proceeds.

Figures 1, 2, 3, 4:
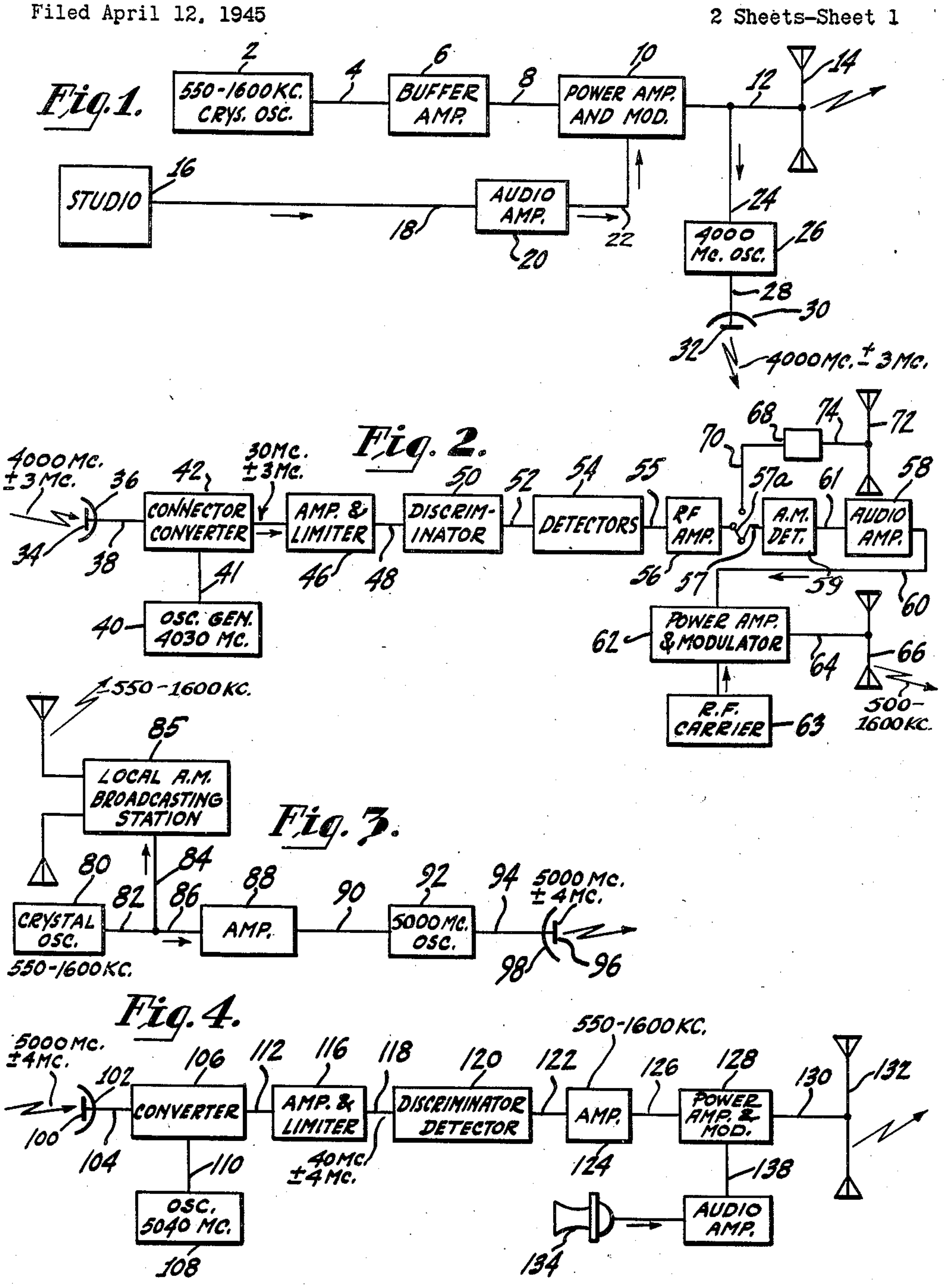
Fig. 1 illustrates a transmitter for locally broadcasting a program and for simultaneously relaying the radio program, by way of a frequency modulated ultra short wave carrier, to a distant point for rebroadcast purposes.
Fig. 2 illustrates a receiving and rebroadcasting system for receiving and rebroadcasting the program directively transmitted thereto by the ultra short wave relaying system of Fig. 1.
Fig. 3 is a modification of Fig. 1 in which an unmodulated carrier is transmitted to a distant broadcasting point whereby the broadcast carrier of the distant point or "satellite" station is maintained in frequency synchronism with the master or control carrier.
Fig. 4 illustrates the receiving system and local modulating apparatus to be used in conjunction with the system of Fig. 3.
Figures 5, 6, 7, 8:
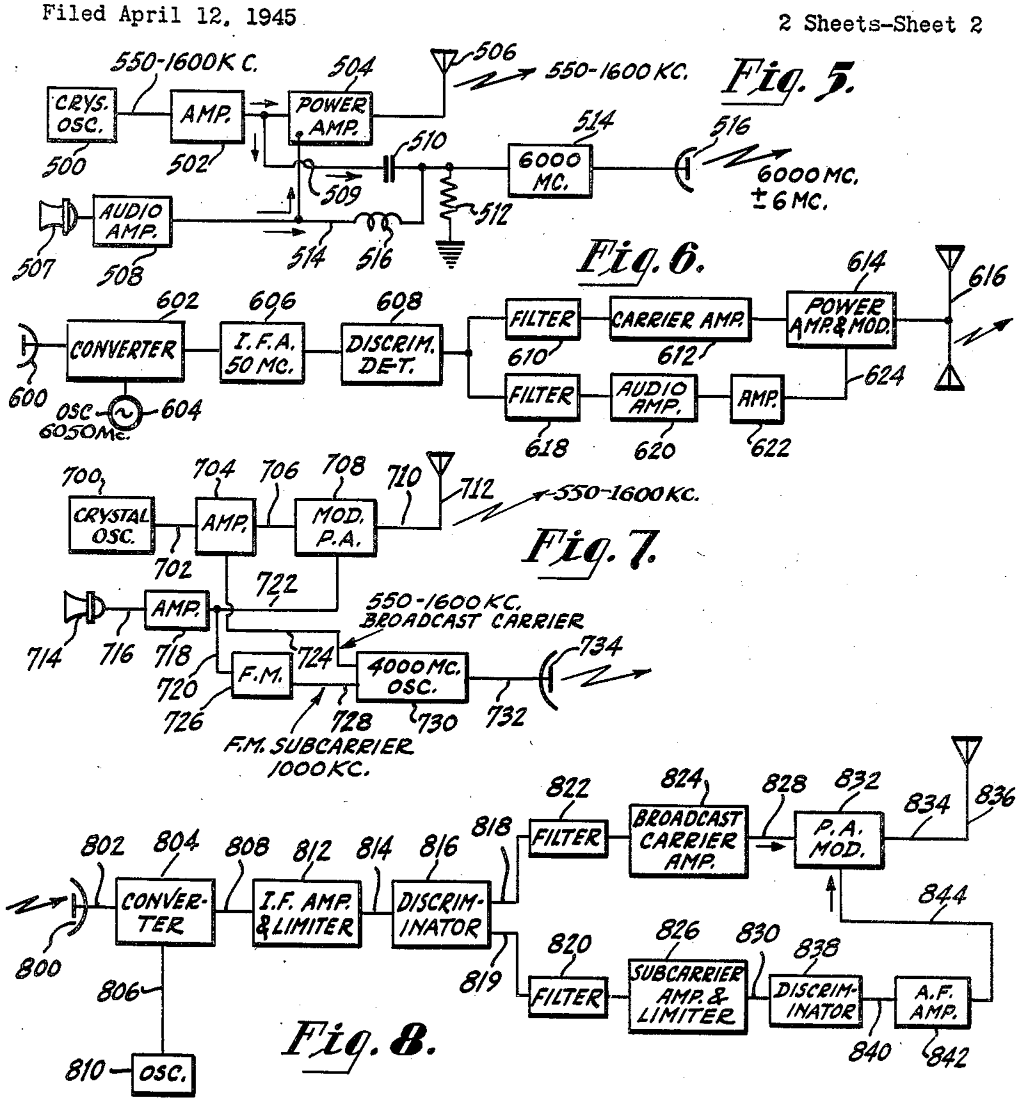
Fig. 5 is a modified transmitting system in which a local audio program is used to amplitude modulate a local broadcast carrier wave and wherein the local broadcast carrier and the local program are employed to frequency modulate an ultra short wave carrier which is to be simultaneously directively transmitted to a distant receiving and rebroadcasting station.
Fig. 6 illustrates the distant receiving and rebroadcasting apparatus for use in conjunction with the transmitting arrangement of Fig. 5.

Fig. 7 is another modification of Fig. 1 wherein the ultra short wave carrier transmitted to a distant point is frequency modulated by the locally generated, unmodulated carrier of broadcast frequency, and, also, by a sub-carrier which has been frequency modulated in accordance with the local audio program, and Fig. 8 illustrates receiving and rebroadcasting apparatus to be used in connection with the system of Fig. 7.

Detailed reference is now made to Figure 1 which shows a transmitting system wherein a program is simultaneously broadcast on the broadcast band of frequencies by amplitude modulation and directively relayed to a distant point for rebroadcasting on a frequency modulated ultra short wavelength carrier.

More specifically, an audio program originating in studio 16 is picked up by a microphone (not shown) and fed over a wire line 18 to an audio amplifier 20. The program picked up may cover a band of audio frequencies lying, for example, between 16 and 15,000 cycles. After being amplified by amplifier 20 the audio program is fed over line 22 to the power amplifier and modulator 10. The latter is supplied with a high frequency current, lying in the band of frequencies from 550 kilocycles to 1600 kilocycles, from a crystal controlled oscillation generator 2. As indicated, a constant frequency wave is derived from the oscillator 2 and fed to the power amplifier and amplitude modulator 10 over line 4, buffer amplifier 6 and connections 8.

The amplitude modulated output from the power amplifier and amplitude modulator 10 is fed over radio frequency transmission line 12 to the broadcasting antenna 14. The latter radiates an amplitude modulated current having a frequency lying in the band from 550 to 1600 kilocycles. Antenna 14 may be of the non-directive type.

In order to broadcast the same program originating in studio 16 simultaneously at some distant broadcasting point, the practice has been to transmit the audio program by wire line to the distant broadcasting transmitter, which may be many miles away. This involves distortion and the introduction of noise—both incident to the use of wire lines. In accordance with the present invention, the same program may be transmitted to the distant broadcasting station in a way which minimizes the introduction of noise and distortion and which preserves the high quality of the original program for the distant broadcasting system.

As shown in Figure 1, this is accomplished by feeding a part of the amplitude modulated output of power amplifier and modulator 10 through line 24 to ultra high frequency oscillation generator 26. This oscillator may operate at a frequency of, for example, 4000 megacycles and is frequency modulated by the amplitude modulated high frequency wave fed to it over conductor 24. Oscillator 26 and the circuits for frequency modulating the same may be of the type described in the co-pending application of Leland E. Thompson, Serial No. 576,453, filed February 6, 1945, particular reference being made to Figure 6 of said application.

The frequency modulated output of ultra high frequency oscillator 26 is fed through transmission line 28 and radiated by means of dipole antenna 32. Radiation from the dipole antenna 32 may be made highly directive by the action of a parabolic reflector 30.

The amplitude of the waves fed to the frequency modulated oscillator 26 over line 24 may be adjusted in any suitable way as, for example, by control of coupling, so that the maximum deviation produced in the wave radiated from antenna 32 is plus and minus 3 megacycles. Obviously, the frequencies chosen throughout are merely illustrative and other values of carrier frequency, audio frequency, band widths and frequency deviations may be used without departing from the spirit of the invention.

Figure 2 illustrates a "satellite" station at which apparatus is provided adapted to receive the ultra short, frequency modulated wave radiated from the antenna system 30, 32 of Figure 1, and to translate the same for use in another amplitude modulated broadcasting station located some distance from the transmitter of Figure 1 and operating at the same or some different broadcast wavelength. Thus in Figure 2, the wave directionally radiated from the antenna reflector combination 30, 32 of Figure 1 is picked up by the antenna reflector arrangement 34, 36 of Figure 2. These antenna reflector elements may be of the type described in Figure 10 of the co-pending application of L. E. Thompson referred to hereinabove.

The received wave is fed over line 38 of Figure 2 to a converter 42 which is also supplied with locally generated oscillations from the ultra short wave oscillation generator 40 which may, for example, operate at a frequency of 4030 megacycles. The output of oscillator 40 is fed to the converter 42 over a suitable coupling or connection 41. Oscillator 40 and converter 42 may be constructed and operated as are the apparatus of Figures 7 and 7*a* in the aforementioned Thompson application.

The beat frequency output of converter 42 may be the "difference" frequency. It is filtered off by the use of tuned circuits and fed through line 44 to the amplifier and limiter 46. The difference frequency for the illustrative case assumed will have a mean frequency of 30 megacycles and a deviation of plus and minus 3 megacycles. The amplified and limited intermediate frequency is then fed over line 48 to the discriminator-detector arrangement 50, 52, 54 which may be of the type described at 930, 932 of Figure 9 of the Thompson application, or which may be of a type described in the U. S. patent to S. W. Seeley, 2,121,103 or in the United States patent to M. G. Crosby #2,071,113.

The output of the detector system 54, connected to the frequency modulation discriminator 50 by way of connection 52, is fed over line 55 to a radio frequency amplifier, it being noted that the output in line 55 corresponds to the amplitude modulated wave in line 24 of Figure 1. The waves fed through line 55 are amplified in the radio frequency amplifier 56, if desired, and then fed through connections 57 to an amplitude modulation detector 59.

The output of the amplitude modulation detector appearing in line 61 corresponds to the original studio program fed over wire line 18 of Figure 1.

The reproduced program in line 61 is amplified in audio amplifier 58 and then fed over line 60 to a power amplifier and modulator 62 supplied with locally generated oscillations from a crystal controlled oscillator 63. The amplitude modulated output of power amplifier 62 is then fed over radio frequency line 64 to a non-directive broadcast radiating antenna 66. The wave reradiated at 66 may be of any frequency lying in the broadcast band depending, of course, on the frequency chosen for the crystal controlled oscillator 63.

Preferably, switch 57*a* of Fig. 2 is thrown to its upper position, and the output of radio frequency amplifier 56 is fed to a further radio frequency amplifier 68 over line 70. The output of amplifier 68 is radiated over the broadcast antenna 72, connected to amplifier 68 by way of line 74.

Figure 3 illustrates apparatus wherein a standard band carrier frequency wave may not only be used to operate a local main transmitter but may also be simultaneously transmitted to one or more "satellite" transmitters operating on the same frequency. Thus the output of a crystal controlled oscillator 80 operating at a constant frequency within the band of say 550 to 1600 kilocycles is fed over line 82 and line 84 to a local amplitude modulated broadcasting station 85 wherein it is amplified, amplitude modulated, and locally broadcast.

Another portion of the wave fed from the crystal controlled oscillator 80 is fed over lines 82, 86 to amplifier 88 and then over a line 90 to an ultra high frequency, frequency modulated. oscillator 92 of the type shown at 26 in Figure 1 and operated at, for example, 5000 megacycles. The frequency modulated output of oscillator 92 is fed over line 94 and directively radiated by means of the antenna reflector combination 96, 98 of a type shown at and described in connection with 30, 32 of Figure 1.

Figure 4 shows a "satellite" station for picking up and utilizing a directively radiated wave radiated from the antenna 96 of Figure 3. This wave having, for example, a mean carrier frequency of 5000 megacycles with a deviation of, for example, plus and minus 4 megacycles, the frequency deviation occurring at the frequency of the crystal controlled oscillator 80 of Figure 3, is directively picked up on the antenna reflector combination 100, 102 of the type shown at 34, 36 in Figure 2. The received wave is then fed over transmission line 104 to a converter 106. Converter 106 is also fed from line 110 with oscillations from a local oscillator 108 operating at, for example, 5040 megacycles. The beat frequency difference appearing in the output of converter 106 is fed through line 112 to the amplifier-limiter 116 and then over line 118 to the discriminator-detector arrangement 120. The latter may be of a type described in U. S. Patent to S. W. Seeley 2,121,103 or in the U. S. Patent to M. G. Crosby 2,071,113. The output of the discriminator-detector will be a wave corresponding in frequency to the frequency of crystal controlled oscillator 80 of Figure 3 and this output is fed through line 122 to the radio frequency amplifier 124 and then over line 126 to the power amplifier and amplitude modulator 128. The amplitude modulated output of power amplifier 128 is fed over line 130 to a non-directive broadcast antenna at 132 for broadcast radiation.

The output of the power amplifier 128 may be modulated with a local program picked up on microphone 134, amplified by audio amplifier 136, and fed to the power amplifier 128 over line 138.

Figure 5 shows a transmitting arrangement wherein a local program is broadcast by amplitude modulation and simultaneously directively relayed (narrowcast) to a distant station by a frequency modulated ultra short wave carrier. Also, in the arrangement of Figure 5, both the local program and the locally generated carrier (which is to be used as the broadcast carrier at a distant point) are simultaneously transmitted as independent, unmodulated waves over a frequency modulated ultra short wave carrier.

Specifically, in Figure 5 oscillations from a crystal controlled oscillator 500, which may have any constant frequency within the band lying between 500 and 1600 kilocycles, are fed to a buffer amplifier 502 and then to a power amplifier and modulator 504. The amplitude modulated output of power amplifier 504, is locally broadcast over the antenna 506.

The power amplifier is supplied with a program for modulation purposes by a microphone 507 whose output is amplified in audio amplifier 508. It will be noted that part of the carrier output of amplifier 502 is fed through a line 509 and condenser 510 to a coupling resistor 512. Also, it will be noted, a part of the output of audio amplifier 508 is fed through a line 514 and high frequency choke coil 516 to the coupling resistor 512. The combined audio signals and carrier waves in resistor 512 are then used to frequency modulate the high frequency, ultra short wave oscillation generator 514 which, as indicated, may have a mean frequency of 6000 megacycles and may be deviated, by way of example, a maximum amount of plus and minus 6 megacycles. Oscillator 514 also may be of the type described in connection with oscillator 26 of Figure 1.

The frequency modulated output of oscillator 514 of Figure 5 is fed to the directive antenna reflector combination 516 and narrowcast to the directive receiving antenna system 600 of Figure 6. The antenna systems 516 of Figure 5 and 600 of Figure 6 may be of the type described at 30—32 in Figure 1.

The received narrowcast wave is beat to a suitable intermediate frequency such as 50 megacycles in converter 602 of Figure 6. For this purpose, converter 602 is fed with a wave of 6050 megacycles from a local oscillation generator 604. The beat frequency wave of 50 megacycles having a deviation of plus and minus 6 megacycles is fed to the amplifiers and limiters 606 and then to the discriminator-detector arrangement 608. The latter may be of the type described in the Seeley or Crosby patents referred to previously.

The output of the discriminator-detector 608 will be the carrier fed through condenser 510 of Figure 5 and the audio program fed through the high frequency choke coil 516 of Figure 5.

The high frequency current in the output of discriminator-detector 608 of Figure 6 is filtered out and passed by filter 610 to a tuned carrier amplifier 612. The output of the tuned carrier amplifier 612 is fed to the amplitude modulated power amplifier 614 whose output, in turn, is radiated over the broadcast antenna 616.

Filter 618 filters and passes or feeds the audio program appearing in the output of discriminator 608 to a series of audio amplifiers 620, 622. The amplified audio signal is fed through line 624 to the power amplifier 614 wherein the audio program amplitude modulates the amplified carrier current.

In the transmitting system of Fig. 7 an unmodulated portion of the local carrier is used to directly frequency modulate (FM) the ultra short wave carrier for directive transmission to some distant rebroadcasting point. Also in Figure 7 part of the audio frequency channel is employed to locally amplitude modulate the local AM carrier. Another part of the audio waves is transmitted on the ultra short wave length carrier by first causing the former to frequency modulate a suitable sub-carrier.

Thus, as shown in Fig. 7, a crystal controlled oscillator may operate at any assigned frequency within the broadcast band, for example, at any frequency lying in the band of 500 kilocycles per second to 1600 kilocycles per second. The output of the crystal controlled oscillator indicated by rectangle 700 which, incidentally, may include buffer amplifiers, is fed over line 702, amplifier 704 and line 706 to the radio frequency power amplifier and amplitude modulator 708. The latter is supplied by way of transmission line 722 with modulating, or audio frequency waves derived from audio amplifier 718 in turn energized by pick-up microphone 714. The latter is connected to amplifier 718 by way of connection 716. The amplitude modulated broadcast frequency wave appearing in the output of power amplifier 708 is fed to transmission line 710 connected to the non-directive broadcast radiating antenna 712.

It will be noted that a portion of the unmodulated radio frequency output of amplifier 704 is fed over line 724 to the ultra short wave oscillator 730 operating at a mean frequency of, for example, 4,000 megacycles. The waves fed over line 724 to oscillator 730 frequency modulate the output of the oscillator with any desired deviation ratio as, for example, 1, 2, 3 or 4.

The 4,000 megacycle wave generated at 730 is concurrently frequency modulated with a frequency modulated sub-carrier having a mean frequency of, for example, 1,000 kilocycles. The frequency modulated sub-carrier is generated at 726 representing apparatus such as described in Fig. 4 of the co-pending application of L. E. Thompson, Serial No. 576,453, filed February 6, 1945. It will be noted that the sub-carrier generated at 726 is frequency modulated by a portion of the audio output of amplifier 718 fed to apparatus 726 over line 720. The output of this oscillator is fed over line 732 to a suitable directive radiating system 734.

The frequency modulated sub-carrier may have a value in frequency of, for example, 1,000 kilocycles, but its value should be changed to some other value such as 700 kilocycles when it is desired that the broadcast carrier radiated over antenna 712 be near 1000 kilocycles.

The amplitude of the waves fed over lines 720 to the sub-carrier generator 726 may be adjusted so as to produce a desired frequency swing in the sub-carrier. Deviation ratios of less than 1, 1, 2, 3, 4 or any other suitable value may be employed. Also the waves fed over lines 724 and 728 may be used to produce any desired and suitable frequency swings in the 4,000 megacycle wave radiated over antenna 734. Here again deviation ratios running from less than 1 up to 4 or 5 or more may be used as desired. For example, the wave appearing in line 728 may be coupled to oscillator 730 to produce a maximum swing of ±4 megacycles in the 4,000 mc. oscillator. Similarly, the wave in line 724 may be coupled to the oscillator 730 so as to produce a maximum swing of ±2 megacycles. With this adjustment, the maximum swing in the wave radiated from antenna 734 will be ±6 megacycles.

Fig. 8 illustrates apparatus for coaction with the transmitting system of Fig. 7. Part of the wave energy radiated from antenna 734 of Fig. 7 is received upon antenna 800 of Fig. 8 and fed through line 802 to converter 804. The latter is also fed from line 806 with locally generated high frequency oscillations generated by oscillator 810. The intermediate beat or difference frequency is fed over line 808 to an intermediate frequency amplifier and limiter 812. The output of the latter is fed over line 814 to discriminator-detector apparatus 816.

In the output lines 818 and 819 of the discriminator-detector 816 will appear a replica of the waves appearing in lines 724 and 728 of Fig. 7. Line 818 is connected to filter 822 designed to pass the carrier frequency appearing in line 724. The output of filter 822 is fed to the broadcast carrier amplifier 824. The output of amplifier 824 is fed over line 828 to a power amplifier and modulator 832. The band of frequencies appearing in line 819, is fed to filter 820 designed to pass the essential frequencies appearing in line 728 of Fig. 7. Thus, the band of frequencies passed by filter 820 corresponding to the frequency modulated sub-carrier of Fig. 7 is fed to the sub-carrier amplifier and limiter 826 of Fig. 8. The limited output of 826 is fed over line 830 to a discriminator-detector in whose output line 840 appears the band of frequencies corresponding to the band appearing in line 720 of Fig. 7. These audio or signal frequency waves are fed over line 840 to an audio or signal frequency amplifier 842 and then by way of connection 844 to the power amplifier and modulator 832 of Fig. 8. The amplitude modulated output of power amplifier 832 is then fed over transmission line 834 to be radiated by the distant broadcasting antenna 836.

If desired, of course, in connection with Fig. 7, line 720 could be connected directly to oscillator 730, in which event, line 724 would be connected to the input of oscillator 726 which would then be given some other, more suitable mean frequency of operation such as 10,000 kilocycles. In that event, and by appropriately altering the apparatus of Fig. 8, the output of discriminator 838 would be the carrier and the output of filter 822 would be the audio frequency program which would then be used to amplitude modulate the broadcast carrier derived from 838.

Having thus described our invention, what we claim is:

1. The method which includes generating a high frequency current, developing relatively low frequency electrical waves corresponding to a program to be transmitted, amplitude modulating the generated current with the low frequency waves and broadcasting the same, combining a portion of the generated current with a portion of the low frequency waves in a circuit wherein modulation does not occur, generating an ultra high frequency current utilizing the combined waves to frequencqy modulate the ultra high frequency current, and transmitting the modulated frequency modulated ultra high frequency current.

2. The method of utilizing the transmitted ultra high frequency current of claim 1 which includes picking up a portion of the wave transmitted, heterodyning the same to an intermediate frequency, subjecting the wave to a frequency demodulation process, filtering the demodulated waves to derive the relatively low frequency current and the program, amplitude modulating the derived low frequency current with the derived program, and transmitting the modulated relatively low frequency current.

3. The method of simultaneously broadcasting and relaying including the steps of generating three waves, one of intermediate carrier frequency, another of sub-carrier frequency and the third of ultra short wave carrier frequency, amplitude modulating a portion of the carrier of intermediate frequency with a signal while concurrently frequency modulating the sub-carrier with the same signal, broadcasting the amplitude modulated carrier, concurrently frequency modulating the ultra short wave carrier with an unmodulated portion of the intermediate frequency carrier and with the frequency modulated sub-carrier and narrowcasting the frequency modulated ultra short wave carrier.

4. A circuit arrangement for simultaneously broadcasting and relaying, comprising in combination a source of signaling waves, a generator of intermediate frequency carrier waves, a generator of sub-carrier waves and a generator of ultra short waves, instrumentalities for amplitude modulating the intermediate frequency carrier with a portion of waves derived from the signal source, means for broadcasting the amplitude modulated waves, a circuit for frequency modulating waves derived from the sub-carrier generator with another portion of waves derived from said signal source, means for simultaneously frequency modulating waves derived from said ultra short wave carrier generator with an unmodulated portion of the waves derived from said intermediate frequency carrier generator and with the frequency modulated sub-carrier waves and an antenna system for directively radiating the frequency modulated ultra short wave carrier.

5. In a relay system the method which includes the steps of receiving an ultra high frequency current frequency modulated with an amplitude modulated high frequency current, demodulating said ultra high frequency current to derive the high frequency current, amplifying the amplitude modulated high frequency current so derived and radiating the same.

6. The method which includes generating a high frequency current, developing relatively low frequency electrical waves corresponding to a program to be transmitted, amplitude modulating the generated current with the low frequency waves and broadcasting the same, generating an ultra high frequency current, frequency modulating said ultra high frequency current with said high frequency wave, frequency modulating said ultra high frequency current with said low frequency wave, and transmitting the frequency modulated ultra high frequency current.

7. The method of utilizing radio waves having high frequency and low frequency current components, said waves being transmitted for relaying purposes, comprising the steps of picking up a portion of the wave transmitted, heterodyning the same to an intermediate frequency, subjecting the intermediate frequency wave to a frequency de-modulation process, filtering the demodulated waves to separately derive the relatively low and high frequency currents, amplitude modulating the derived high frequency current with the derived low frequency current and transmitting the modulated currents so produced.

8. The method which comprises the steps of generating a high frequency current, developing a low frequency current corresponding to a program, amplitude modulating said generated current with said low frequency current and broadcasting the same, generating an ultra high frequency wave, frequency modulating said ultra high frequency wave by said high frequency current and independently by said low frequency current and radiating said modulated ultra high frequency wave.

9. The method which comprises the steps of, at one location, generating a high frequency current, developing a low frequency current corresponding to a program, amplitude modulating said generated current and broadcasting the same, generating an ultra high frequency wave, frequency modulating said ultra high frequency wave by said high frequency current and said low frequency current, radiating said modulated ultra high frequency wave and, at another location, receiving said modulated ultra high frequency wave, deriving from said wave said high frequency current and said low frequency current corresponding to a program, modulating said high frequency current by said low frequency current and radiating said modulated high frequency current.

10. In combination a source of signalling waves, a generator of intermediate frequency carrier waves, a generator of sub-carrier waves and a generator of ultra short waves, instrumentalities for amplitude modulating the intermediate frequency carrier with a portion of waves derived from the signal source, means for broadcasting the amplitude modulated waves, a circuit for frequency modulating waves derived from the sub-carrier generator with another portion of waves derived from said signal source, means for simultaneously frequency modulating waves derived from said ultra short wave generator with an unmodulated portion of the waves derived from said intermediate frequency carrier generator and with the frequency modulated sub-carrier waves and an antenna system for narrowcasting the frequency modulated ultra short wave carrier, means for receiving said narrowcast ultra short wave carrier, means for deriving from said carrier said intermediate frequency carrier, means for deriving said signalling waves, means for modulating said intermediate frequency carrier by said signalling waves and means for broadcasting said modulated carrier.

11. The method which comprises the steps of, at one location, generating a high frequency current, developing a low frequency current corresponding to a program, amplitude modulating said generated current and broadcasting the same, generating an ultra high frequency wave frequency modulated by said high frequency current and by said low frequency current corresponding to a program and narrowcasting the same, and at another location, receiving said narrowcast wave, deriving from said wave said low frequency current corresponding to a program, deriving from said wave said high frequency current, amplitude modulating said derived high frequency current by said derived low frequency current and radiating said modulated high frequency current.

12. A radio broadcasting and relaying system including at one location, a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave frequency modulated by said low frequency current corresponding to a program and by said high frequency current and an antenna coupled to said generator to narrowcast said ultra high frequency wave, and at another location, means to receive said narrowcast wave, means coupled to said receiving means to derive said low frequency current corresponding to a program, means to derive said high frequency current, a modulator circuit, means to apply said derived high frequency current and said derived low frequency current to said modulator circuit to amplitude modulate said derived high frequency current by said derived low frequency current to produce an amplitude modulated wave and another aerial coupled to said modulator circuit to broadcast said amplitude modulated wave.

13. A radio broadcasting and relaying system including at one location, a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave independently frequency modulated by said low frequency current corresponding to a program and by said high frequency current and an antenna coupled to said generator to narrowcast said ultra high frequency wave, and at another location, means to receive said narrowcast wave, a filter coupled to said receiving means to derive said low frequency current corresponding to a program, a further filter coupled to said receiving means to derive said high frequency current, a modulator circuit coupled to said filters to amplitude modulate said derived high frequency current by said derived low frequency current to produce an amplitude modulated wave and another aerial coupled to said modulator circuit to broadcast said amplitude modulated wave.

14. A radio broadcasting and relaying system including at one location, a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave, a coupling circuit coupled to said generator, means to apply said low frequency current and said high frequency current to said coupling circuit to independently frequency modulate said ultra-high frequency wave by said low frequency current corresponding to a program and by said high frequency current and an antenna coupled to said generator to narrowcast said ultra high frequency wave, and at another location, means to receive said narrowcast wave, a filter coupled to said receiving means to derive said low frequency current corresponding to a program, a further filter coupled to said receiving means to derive said high frequency current, a modulator circuit coupled to said filters to amplitude modulate said derived high frequency current by said derived low frequency current to produce an amplitude modulated wave and another aerial coupled to said modulator circuit to broadcast said amplitude modulated wave.

15. A radio broadcasting and relaying system including at one location, a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave, a sub-carrier generator to produce a sub-carrier frequency modulated by said low frequency current corresponding to a program, means to apply said frequency modulated sub-carrier and said high frequency current to said generator to produce a doubly modulated ultra high frequency wave and an antenna coupled to said generator to narrowcast said doubly modulated ultra high frequency wave, and at another location, means to receive said narrowcast wave, a discriminator coupled to said receiving means to derive said low frequency current corresponding to a program, a filter coupled to said receiving means to derive said high frequency current, a modulator circuit coupled to said filter and said discriminator to amplitude modulate said derived high frequency current by said derived low frequency current to produce an amplitude modulated wave and another aerial coupled to said modulator circuit to broadcast said amplitude modulated wave.

16. A radio broadcasting and relaying system including at one location, a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave, a sub-carrier generator to produce a sub-carrier frequency modulated by said low frequency current corresponding to a program, means to apply said frequency modulated sub-carrier and said high frequency current to said generator to produce a doubly modulated ultra high frequency wave and an antenna coupled to said generator to narrowcast said doubly modulated ultra high frequency wave, and at another location, means to receive said narrowcast wave, a filter, a limiter and a discriminator coupled in cascade arrangement to said receiving means to derive said low frequency current corresponding to a program, a second filter coupled to said receiving means to derive said high frequency current, a modulator circuit coupled to said cascade arrangement and said second filter to amplitude modulate said derived high frequency current by said derived low frequency current to produce an amplitude modulated wave and another aerial coupled to said modulator circuit to broadcast said amplitude modulated wave.

17. An arrangement for simultaneously broadcasting and relaying a program, including a transducer to develop a low frequency current corresponding to said program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave frequency modulated by said low frequency current corresponding to a program and by said high frequency current, and an antenna coupled to said generator to narrowcast said ultra high frequency wave.

18. An arrangement for broadcasting a program transmitted by a narrowcast wave frequency modulated by a high frequency current and separated by a low frequency current corresponding to said program, including receiving means, means coupled to said receiving means to derive said low frequency current corresponding to a program, means to derive said high frequency current, a modulator circuit, means to apply said derived high frequency current and said derived low frequency current to said modulator circuit to amplitude modulate said derived high frequency current by said derived low frequency current to produce an amplitude modulated wave, and an aerial coupled to said modulator circuit to broadcast said amplitude modulated wave.

19. An arrangement for simultaneously broadcasting and relaying a program, including a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave frequency independently modulated by said low frequency current corresponding to a program and by said high frequency current and an antenna coupled to said generator to narrowcast said ultra high frequency wave.

20. An arrangement for broadcasting a program transmitted by a narrowcast wave frequency modulated by a high frequency current and separated by a low frequency current corresponding to said program, including receiving means, a filter coupled to said receiving means to derive said low frequency current corresponding to a program, a further filter coupled to said receiving means to derive said high frequency current, a modulator circuit coupled to said filters to amplitude modulate said derived high frequency current by said derived low frequency current to produce an amplitude modulated wave, and an aerial coupled to said modulator circuit to broadcast said amplitude modulated wave.

21. An arrangement for simultaneously broadcasting and relaying a program, including a transducer to develop a low frequency current corresponding to a program, an oscillator to produce a high frequency current, a modulator coupled to said oscillator and said transducer to amplitude-modulate said high frequency current by said low frequency current to produce an amplitude modulated wave and an aerial coupled to said modulator to broadcast said amplitude modulated wave, a generator arranged to generate an ultra high frequency wave, a sub-carrier generator to produce a sub-carrier frequency modulated by said low frequency current corresponding to a program, means to apply said frequency modulated sub-carrier and said high frequency current to said generator to produce a doubly-modulated ultra high frequency wave, and an antenna coupled to said generator to narrowcast said doubly-modulated ultra high frequency wave.

22. An arrangement for broadcasting a program transmitted by a narrowcast wave frequency modulated by a high frequency current and separated by a low frequency current corresponding to said program, including receiving means, a discriminator coupled to said receiving means to derive said low frequency current corresponding to a program, a filter coupled to said receiving means to derive said high frequency current, a modulator circuit coupled to said filter and said discriminator to amplitude modulate said derived high frequency current by said derived low frequency current to produce an amplitude modulated wave, and an aerial coupled to said modulator circuit to broadcast said amplitude modulated wave.

DONALD S. BOND.
LELAND E. THOMPSON.

REFERENCES CITED

The following references are of record in the file of this patent:

UNITED STATES PATENTS

| Number | Name | Date |
|---|---|---|
| 1,568,938 | Clement | Jan. 5, 1926 |
| 1,635,153 | Clement | July 5, 1927 |
| 1,918,262 | Goldsmith | July 18, 1933 |
| 2,140,730 | Batchelor | Dec. 20, 1938 |
| 2,148,532 | Chaffee | Feb. 28, 1939 |
| 2,155,821 | Goldsmith | Apr. 25, 1939 |
| 2,283,575 | Roberts | May 19, 1942 |
| 2,284,415 | Goldstine | May 26, 1942 |
| 2,358,382 | Carlson | Sept. 19, 1944 |
| 2,458,124 | Wilmotte | Jan. 4, 1949 |